Feb. 22, 1966     H. J. SIMPSON     3,236,268
DEVICE FOR TRANSFERRING LIQUID
Filed April 26, 1963
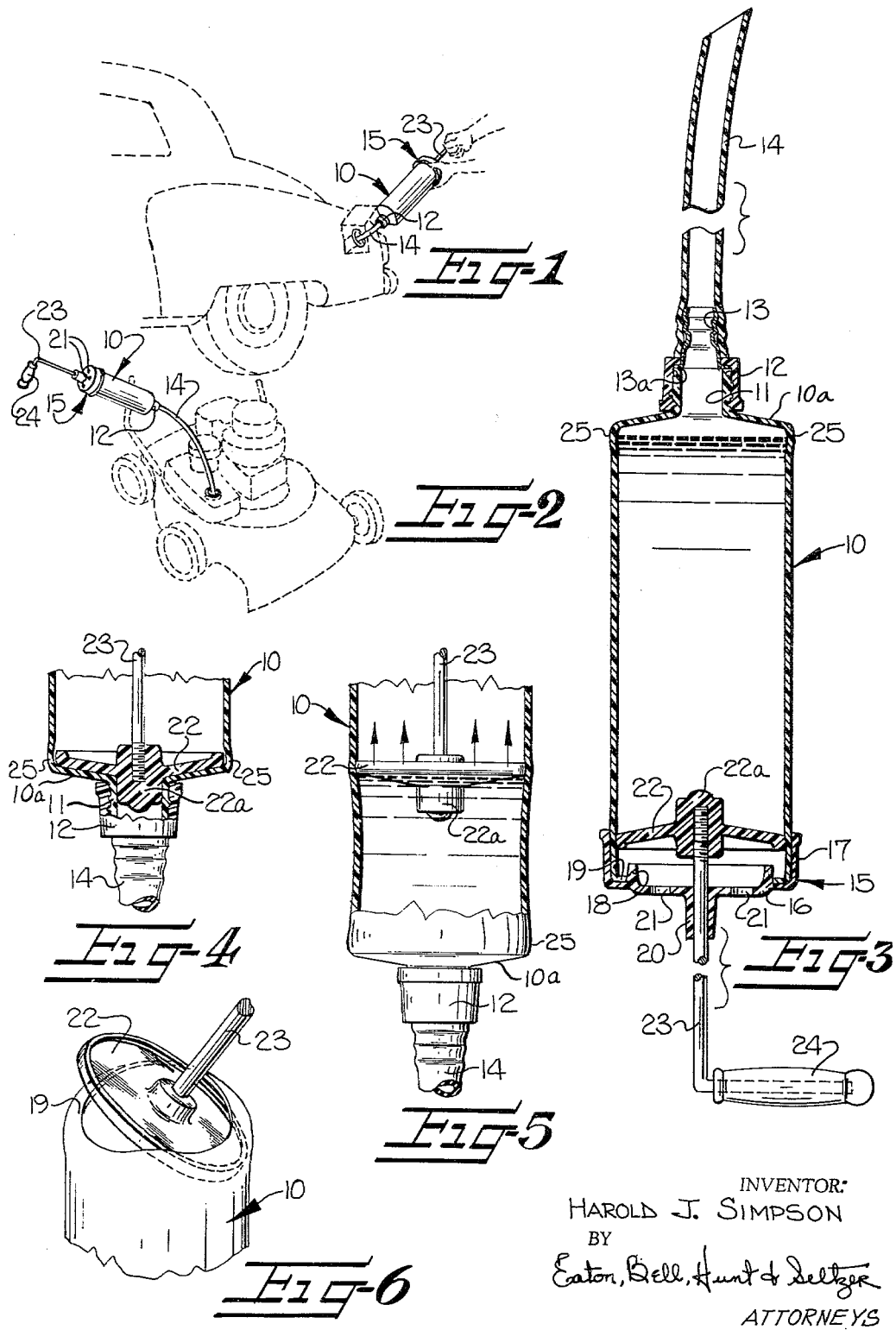
INVENTOR:
HAROLD J. SIMPSON
BY
Eaton, Bell, Hunt & Seltzer
ATTORNEYS

United States Patent Office 3,236,268
Patented Feb. 22, 1966

3,236,268
DEVICE FOR TRANSFERRING LIQUID
Harold J. Simpson, Charlotte, N.C., assignor to Gas Getter Co. Inc., Charlotte, N.C., a corporation of North Carolina
Filed Apr. 26, 1963, Ser. No. 276,019
8 Claims. (Cl. 141—27)

The present invention relates generally to a device suitable for use in transferring liquid from one container to another, and more particularly to an improved device of knockdown construction for transferring gasoline from the gasoline tank of a vehicle to an empty fuel tank of another gasoline-powered vehicle or other device, such as a lawn mower powered by a gasoline-operated motor.

Many homeowners have gasoline-powered lawn mowers and other gasoline-powered gardening equipment to facilitate their gardening activities. It is customary, therefore, to store a container of gasoline on the home premises for providing a reserve supply of fuel to fill the fuel tank of the gasoline-powered lawn mower or other piece of gasoline-powered equipment when necessary. Proper safety standards for the storage of gasoline are not always obserbed by such homeowners, and the container of gasoline is frequently stored in a location likely to accentuate the hazards of a possible fire and/or explosion accompanying the storage of gasoline, such as the placing of the container of gasoline near the furnace for supplying heat to the home. Many serious accidents and costly fires resulting from improper care of such gasoline containers on home premises are annually reported.

It is therefore an object of this invention to provide a new and improved device for transferring gasoline from one container to another, wherein the device is of knockdown construction and is ordinarily stored after each use thereof with its parts disassembled to discourage storage of gasoline therein when the device is not in use. The device can be readily and quickly assembled for each use thereof and may accordingly serve the same purpose of a container of gasoline—that of being used to re-fuel an empty fuel tank—by extracting gasoline from the fuel tank of a vehicle and transferring the gasoline to the empty fuel tank. The storage of a continer of gasoline on home premises with its attendant hazards to provide a reserve supply of fuel for gasoline-powered lawn mowers or other gasoline-powered equipment is thereby rendered unnecessary by my device.

It is another object of this invention to provide an improved device for transferring liquid from one container to another, wherein the device is of knockdown construction and comprises a cylinder of flexible elastic material having an elongated hose on one end thereof communicating with the interior of the cylinder and a reciprocable piston mounted in the cylinder for longitudinal movement upon manual operation of a piston rod attached to the piston and extending outwardly of the other end of the cylinder, the piston being so constructed as to have an outer diameter approximating the internal diameter of the cylinder with movement of the piston longitudinally in the cylinder in a direction away from the end thereof to which the hose is connected creating a vacuum in the cylinder in the portion thereof between the piston and the hose to successively and sequentially draw portions of the cylinder surrounding the piston into tight engagement therewith. In this way, liquid may be drawn from a container, such as the fuel tank of a vehicle, into the cylinder through the hose upon movement of the piston in a direction away from the hose, and the liquid may be subsequently dispensed from the cylinder into another container, such as the empty fuel tank of a power lawn mower, through the hose upon movement of the piston in a direction toward the hose.

It is another object of this invention to provide an improved device for transferring liquid from one container to another, the device including a cylinder of flexible elastic material having an elongated hose on one end thereof communicating with the interior of the cylinder and being open at its other end for admitting a piston therewithin, wherein the piston has a piston rod attached thereto and extending outwardly of the open end of the cylinder with the piston rod carrying an end cap which is adapted to be frictionally installed on the open end of the cylinder to form a removable closure for the open end of the cylinder, thereby facilitating disassembly of the device when not in use by removal of the end cap from the open end of the cylinder and withdrawal of the piston from the cylinder. The piston has an outer diameter approximating the internal diameter of the cylinder so that during use of the assembled device, manual operation of the piston rod to move the piston longitudinally in the cylinder in a direction away from the hose connected to one end of the cylinder induces a vacuum in the cylinder in the portion thereof between the piston and the hose to successively and sequentially draw portions of the cylinder surrounding the piston into tight engagement therewith which will allow liquid to be drawn from a container, such as the fuel tank of a vehicle, into the cylinder through the hose. The liquid in the cylinder may be subsequently dispensed therefrom into another container, such as the empty fuel tank of a power lawn mower, and the device is thereafter disassembled until its use is again required.

Some of the objects of the invention having been stated, other objects will appear as the description proceeds, when taken in connection with the accompanying drawings, in which—

FIGURE 1 is a perspective view of a device for transferring liquid from one container to another, as constructed in accordance with the present invention, the device being illustrated when placed in use to extract gasoline from the fuel tank of an automobile, with the automobile being shown in phantom lines;

FIGURE 2 is a perspective view of the liquid transferring device similar to FIGURE 1, but showing the subsequent use of the device for dispensing gasoline therefrom into the fuel tank of a gasoline-powered lawn mower, with the lawn mower being shown in phantom lines;

FIGURE 3 is an enlarged longitudinal sectional view of the liquid transferring device, FIGURE 3 being partially broken away and showing the device filled with gasoline or other liquid;

FIGURE 4 is an enlarged fragmentary longitudinal sectional view, partially in elevation, and turned 180 degrees from the sectional view in FIGURE 3 to show the device as it appears just prior to the extraction of gasoline from the fuel tank of the automobile in FIGURE 1;

FIGURE 5 is an enlarged fragmentary longitudinal sectional view, partially in elevation and similar to FIGURE 4, but showing a further stage in the use of the device for extracting gasoline from the fuel tank of the automobile in FIGURE 1; and FIGURE 6 is an enlarged fragmentary perspective view of the device, showing the disassembly of components thereof.

Referring more specifically to the drawings, the liquid transferring device in accordance with the present invention comprises an elongated receptacle which includes a body portion or tube in the form of a cylinder 10 made of flexible elastic material, such as polyethylene or other suitable plastics, for example. One end 10a of the cylinder 10 tapers radially inwardly to a neck 11 of reduced diameter to define a bottom wall, the neck 11 providing a restricted passageway therethrough. A centrally apertured cap 12 is threadably received by the neck 11 of the cylinder 10. A fitting 13 extends through the central aperture in the cap 12, the fitting 13 having serrations on its outer surface for gripping the end of a flexible hose or conduit 14 securely thereabout. The fitting 13 also has an annular flange 13a on its end which is disposed within the cap 12, the flange 13a extending radially outwardly to retain the fitting 13 and the hose 14 in secured relation to the cap 12. A fluid-tight seal between the fitting 13 and the neck 11 is obtained when the cap 12 has been fully screwed about the neck 11 to tightly hold the flange 13a of the fitting 13 against the top edge of the neck 11. Together, the neck 11, cap 12 threadably received thereby, fitting 13 and hose 14 may be characterized as a nozzle on one end of the cylinder 10 which has a passageway therethrough communicating with the interior of the cylinder 10.

The other end of the cylinder 10 is open, the cylinder 10 having a radially inturned lip 19 bounding the hole which forms the open end of the cylinder 10. A removable closure member 15 is provided to close the open end of the cylinder 10. The closure member 15 comprises an end cap 16 closing the open end of the cylinder 10 and having a marginal annular flange 17 extending axially in overlying frictional engagement with the terminal portion of the cylinder 10 adjacent the open end thereof. The end cap 16 is further provided with an annular axially extending rib 18 disposed radially inwardly of the marginal flange 17 in parallel spaced relationship with respect thereto. It will be observed that an annular groove is defined in the closure member 15 between the marginal flange 17 and the annular rib 18 of the end cap 16, with the end cap 16 forming the bottom wall of the groove.

The end cap 16 also includes a thickened central hub 20 having a bore therethrough and vent holes 21 located radially outwardly of the thickened central hub 20.

In accordance with the present invention, the terminal portion of the cylinder 10 adjacent the open end thereof is adapted to be forced within the marginal flange 17 of the end cap 16 in frictional engagement therewith until the radially inturned lip 19 of the cylinder 10 is received within the annular groove formed between the marginal flange 17 and the annular rib 18 in engagement with the bottom wall of the groove provided by the end cap 16. The inner edge of the inturned lip 19 seats against the annular rib 18 to limit radially inward deformation of the lip 19. The end cap 16 is thereby removably positioned on the terminal portion of the cylinder 10 adjacent the open end thereof with the terminal portion of the cylinder 10 frictionally engaging the marginal flange 17 and the lip 19 engaging the bottom wall of the groove formed in the closure member 15.

A piston or plunger 22 is mounted within the cylinder 10 for reciprocable movement longitudinally between the ends thereof. The piston 22 is formed of relatively rigid material, which may be plastic, metal, or other suitable material, and comprises a disc having a central boss 22a projecting axially from both sides of the disc. The disc comprising the piston 22 has an outer diameter which approximates the internal diameter of the cylinder 10.

A piston rod or plunger rod 23 is threadably received at one end in the central boss 22a of the piston 22 and extends outwardly of the cylinder 10 through the end cap 16, the piston rod 23 being slidably received through the bore in the thickened central hub 20 of the end cap 16. The end of the piston rod 23 disposed outwardly of the cylinder 10 is provided with a handle 24 which may be grasped to manually push or pull the piston rod 23 for moving the piston 22 longitudinally within the cylinder 10 in either direction.

Referring to FIGURES 3, 4, and 5, it will be observed that the cylinder 10 is provided with a slight radially outward bulge 25 in the region adjacent the radially inwardly tapering portion thereof leading to neck 11. This slight radially outward bulge 25 is somewhat rigid and possesses less flexibility and elasticity than the remaining portion of the cylinder 10. The slight radially outward bulge 25 and the closure member 15 at the opposite end of the cylinder 10 thereby provide reinforced areas at opposite ends of the cylinder 10 between which extends the main portion of the cylinder 10 of a flexible elastic nature. When the closure member 15 is removed from the open end of the cylinder 10, the terminal portion of the cylinder 10 adjacent its open end assumes its normal flexibility and elasticity to readily permit removal of the piston 22 from the cylinder 10 through the open end thereof, as illustrated in FIGURE 6. With the closure member 15 in place over the open end of the cylinder 10 so that the marginal flange 17 of the end cap 16 frictionally engages the terminal portion of the cylinder 10 adjacent its open end, the terminal portion of the cylinder 10 adjacent its open end is contracted radially inwardly to a slight degree by the overlying marginal flange 17 of the end cap 16, and movement of the piston 22 to the position shown in FIGURE 3 causes binding of the terminal portion of the cylinder 10 adjacent its open end between the marginal flange 17 of the end cap 16 and the piston 22 to form a fluid-tight seal at this end of the cylinder 10.

In operation, the flexible hose 14 of the device is inserted in the fuel tank of an automobile as illustrated in FIGURE 1 with the piston 22 disposed in the cylinder 10 at the position shown in FIGURE 4, wherein the piston 22 is loosely received within the portion of the cylinder 10 identified by the slight radially outward bulge 25 at the end of the cylinder 10 to which the hose 14 is attached. In this connection, it will be observed that the forwardly projection portion of the central boss 22a of the piston 22 is slidably received within the neck 11 and that the forwardly disposed face of the disc of the piston 22 is shaped to conform to the radially inwardly tapered end of the cylinder 10 so that substantially no air space is present within the cylinder 10 between the piston 22 and the radially inwardly tapered end of the cylinder 10. Upon retracting the piston 22 in the cylinder 10 in a direction away from the neck 11 by grasping the handle 24 and pulling the piston rod 23 outwardly of the cylinder 10, a vacuum is induced in the cylinder 10 in the portion thereof traversed by the piston 22 or opposite from the direction of movement of the piston 22. This induced vacuum tends to cause the flexible elastic intermediate portion of the cylinder 10 surrounding the piston 22 to be successively and sequentially drawn radially inwardly to tighten the engagement between the piston 22 and the cylinder 10 (FIGURE 5), as the piston 22 is being retracted in the cylinder 10. The enhanced engagement between the piston 22 and the cylinder 10 approaches a fluid-tight seal and assists in maintaining the induced vacuum at an efficient level. This radially inward deformation of successive portions of the cylinder 10 occurs within the elastic limit of the cylinder 10 and is therefore of a temporary nature. The vacuum induced by the retraction of the piston 22 also causes gasoline to be extracted from the fuel tank in the automobile through the hose 14 and into the cylinder 10.

Retractive movement of the piston 22 is continued in the manner described until the piston 22 is moved to the position shown in FIGURE 3 which forms a fluid-tight seal at the opposite end of the cylinder 10 by binding the terminal portion of the cylinder 10 adjacent its open end between the marginal flange 17 of the end cap 16 and the piston 22. The construction of the piston 22 and its central boss 22a as related to the radially inwardly tapered end of the cylinder 10 and the neck 11 is such that a maximum volume of gasoline may be sucked into the cylinder 10. The cylinder 10 now contains a supply of gasoline extracted from the fuel tank of the automobile, and the hose 14 of the device is withdrawn from the fuel tank of the automobile. The device is then held with the neck 11 disposed in an upright position to avoid spilling the gasoline from the cylinder 10. Thereafter, the hose 14 may be inserted in another fuel tank, such as the empty fuel tank of a gasoline-powered lawn mower, as illustrated in FIGURE 2. The device is tilted to downwardly dispose the neck 11 of the cylinder 10, whereupon the gasoline contained within the cylinder 10 is transferred through the hose 14 into the fuel tank of the lawn mower. This latter operation transferring the gasoline from the cylinder 10 to the fuel tank of the lawn mower may be generally accomplished without movement of the piston 22. If difficulty is encountered in effecting the transfer of the gasoline, the gasoline may be pumped from the cylinder 10 by pushing against the handle 24 to move the piston rod 23 inwardly of the cylinder 10, thereby driving the piston 22 forwardly toward the neck 11 at the opposite end of the cylinder 10 and dispensing the gasoline therefrom through the hose 14 into the fuel tank of the lawn mower. If desired, the hose 14 may be removed from the nozzle end of the cylinder 10, and the gasoline may be dispensed into the fuel tank of the lawn mower from the cylinder 10 through the fitting 13 which is introduced into the fuel tank of the lawn mower. As the piston 22 is moved forwardly in the cylinder 10 toward the neck 11, air is admitted into the cylinder 10 behind the piston 22 through the vent holes 21 in the end cap 16 to prevent formation of a vacuum. In this instance, an enhanced degree of engagement between the piston 22 and the interior surface of the cylinder 10 as the piston 22 is moved forwardly in the cylinder 10 is of no particular benefit and is not encouraged, the piston 22 acting merely as a pumping member to assist the gravity flow of the gasoline from the inverted cylinder 10.

When the device is not in use, the closure member 15 is removed from the terminal portion of the cylinder 10 adjacent the open end thereof along with the piston 22 and the piston rod 23 attached thereto, and the cap 12 and fitting 13 are disengaged from the neck 11 to expose the interior of the cylinder 10 at both ends thereof to air, thereby harmlessly dissipating any gasoline vapors or fumes which may be present within the cylinder 10. In this connection, it will be observed that my device is constructed in such a manner that it will not be fully closed even when it is in use, thereby discouraging the storage of gasoline or other volatile liquids within the cylinder 10 for an extended period when the device is not in active use.

While my device has been described with particular reference to its use in transferring gasoline from the fuel tank of an automobile to an empty fuel tank of a gasoline-powered lawn mower, it will be understood that my device is of general utility in transferring a liquid from one container to another. In this respect, another purpose for which my device is readily applicable is in accomplishing the emergency transfer of gasoline from the fuel tank of one automobile to the empty fuel tank of another automobile to enable the motorist of the other automobile to reach a filling station without undue inconvenience and delay.

In the drawings and specification there has been set forth a preferred embodiment of the invention and although specific terms are employed, they are used in a generic and descriptive sense only and not for purposes of limitation, the scope of the invention being defined in the claims.

I claim:
1. A device for transferring liquid such as gasoline from one container to another comprising
  (a) a tube of flexible elastic material having a substantially uniform transverse cross-section throughout its length,
  (b) a piston having a transverse cross-section complementary to that of said tube and being mounted within said tube,
  (c) said tube having a bottom wall at one end thereof with a restricted passageway therethrough,
  (d) means connected to said piston and extending through the other end of said tube for moving said piston longitudinally within said tube, and
  (e) the material of said tube being such that portions of said tube surrounding said piston are successively and sequentially drawn inwardly into tight engagement with said piston in response to actuation of said means moving said piston longitudinally in said tube to induce a vacuum in said tube in the portion thereof opposite from the direction of movement of said piston to thus draw gasoline through the restricted passageway into the tube.

2. A device for transferring liquid such as gasoline from one container to another comprising
  (a) an elongated cylinder of flexible elastic material,
  (b) a piston having a transverse circular cross-section and being mounted within said cylinder, said piston having an outer diameter approximating the inner diameter of said cylinder,
  (c) said cylinder having a bottom wall at one end thereof with a restricted passageway therethrough,
  (d) means connected to said piston and extending through the other end of said cylinder for moving said piston longitudinally within said cylinder, and
  (e) the material of said cylinder being such that portions of said cylinder surrounding said piston are successively and sequentially drawn radially inwardly into tight engagement with said piston in response to actuation of said means moving said piston longitudinally in said cylinder in a direction away from said bottom wall of said cylinder to induce a vacuum in said cylinder in the portion thereof between said piston and said bottom wall to thus draw gasoline through the restricted opening into the cylinder.

3. A device for transferring liquid such as gasoline from one container to another comprising
  (a) an elongated cylinder, said cylinder having a flexible elastic intermediate portion and relatively rigidified portions at opposite ends of the flexible elastic intermediate portion,
  (b) a piston having a transverse circular cross-section and being mounted within said cylinder, said piston having an outer diameter approximating the inner diameter of the flexible elastic intermediate portion of said cylinder,
  (c) said cylinder having a bottom wall at one end thereof with a restricted passageway therethrough,
  (d) means connected to said piston and extending through the other end of said cylinder for moving said piston longitudinally within said cylinder, and
  (e) the portions of the flexible elastic intermediate portion of said cylinder surrounding said piston being successively and sequentially drawn radially inwardly into tight engagement with said piston in response to actuation of said means moving said piston longitudinally in said cylinder in a direction away from said bottom wall of said cylinder to induce a vacuum in said cylinder in the portion thereof between said piston and said bottom wall to thus draw gasoline through the restricted opening into the cylinder.

4. A device for transferring liquid such as gasoline from one container to another comprising
  (a) an elongated cylinder of flexible elastic material,
  (b) said cylinder having an opening in one end thereof, (c) nozzle means connected to said one end of said cylinder and having a passageway therethrough communicating with the opening in said one end of the cylinder,
(d) the other end of said cylinder being open,
(e) removable closure means for the open end of said cylinder, said closure means comprising
(1) an end cap closing the open end of said cylinder,
(2) a marginal axially extending annular flange on said end cap in overlying frictional engagement with said cylinder, and
(3) an annular axially extending rib on said end cap disposed radially inwardly of said marginal flange in parallel spaced relationship with respect thereto;
(f) said end cap, said flange, and said rib cooperating to define an annular groove,
(g) the terminal portion of said cylinder adjacent the open end thereof being received in the annular groove so as to seat against the bottom wall of the groove with said terminal portion of said cylinder frictionally engaging said flange and the bottom wall of the groove,
(h) piston means slidably mounted within said cylinder,
(i) means connected to said piston means and slidably extending through said end cap for moving said piston means longitudinally within said cylinder so that liquid is adapted to be drawn into said cylinder through the passageway in said nozzle means upon movement of said piston means in a direction toward said end cap, and liquid is adapted to be dispensed from said cylinder through the passageway in said nozzle means upon movement of said piston means in a direction toward said nozzle means, and
(j) the material of said cylinder being such that portions of said cylinder surrounding said piston are successively and sequentially drawn radially inwardly into tight engagement with said piston in response to actuation of said means moving said piston longitudinally in said cylinder in a direction toward said cap to induce a vacuum in said cylinder in the portion thereof between said piston and said one end of said cylinder.

5. A device for transferring liquid such as gasoline from one container to another comprising
(a) an elongated cylinder of flexible elastic material,
(b) said cylinder having an opening in one end thereof,
(c) nozzle means connected to said one end of said cylinder and having a passageway therethrough communicating with the opening in said one end of the cylinder,
(d) the other end of said cylinder being open,
(e) removable closure means for the open end of said cylinder, said closure means comprising
(1) an end cap closing the open end of said cylinder,
(2) a marginal axially extending annular flange on said end cap in overlying frictional engagement with said cylinder, and
(3) an annular axially extending rib on said end cap disposed radially inwardly of said marginal flange in parallel spaced relationship with respect thereto;
(f) said end cap, said flange, and said rib cooperating to define an annular groove,
(g) the terminal portion of said cylinder adjacent the open end thereof being received in the annular groove so as to seat against the bottom wall of the groove with said terminal portion of said cylinder frictionally engaging said flange and the bottom wall of the groove,
(h) a piston having a transverse circular cross-section and being mounted within said cylinder, said piston having an outer diameter approximating the inner diameter of said cylinder,
(i) means connected to said piston and slidably extending through said end cap for moving said piston longitudinally within said cylinder, and
(j) the material of said cylinder being such that portions of said cylinder surrounding said piston are successively and sequentially drawn radially inwardly into tight engagement with said piston in response to actuation of said means moving said piston longitudinally in said cylinder in a direction away from said one end of said cylinder to induce a vacuum in said cylinder in the portion thereof between said piston and said one end of said cylinder to thus draw gasoline through the passageway in said nozzle means into the cylinder.

6. A device for transferring liquid from one container to another as set forth in claim 5 wherein
(k) an integral radially inwardly extending annular lip is provided on said cylinder bounding the open end thereof, said annular lip being seated against the bottom wall of the groove defined in said closure means with its inner edge engaging said rib.

7. A device for transferring liquid from one container to another as set forth in claim 5 wherein
(k) said marginal flange on said end cap overlying the terminal portion of said cylinder adjacent the open end thereof in frictional engagement therewith constricts said terminal portion radially inwardly, and
(1) movement of said piston longitudinally in said cylinder in a direction away from said one end of said cylinder to a position underlying said terminal portion of said cylinder adjacent the open end thereof binding said terminal portion between said marginal flange and said piston to form a fluid-tight seal.

8. A device for transferring liquid such as gasoline from one container to another comprising
(a) an elongated cylinder of flexible elastic material,
(b) said cylinder having an integrally formed bottom wall at one end thereof with a neck of reduced diameter extending therefrom,
(c) said neck having a passageway therethrough communicating with the interior of said cylinder,
(d) an elongated flexible hose connected to said neck and extending outwardly with respect to said cylinder,
(e) a piston having a transverse circular cross-section and being mounted within said cylinder, said piston having an outer diameter approximating the inner diameter of said cylinder,
(f) a centrally disposed, enlarged boss on said piston axially protruding beyond the face of said piston proximally related to said one end of said cylinder and being slidably receivable in the passageway through said neck,
(g) the face of said piston proximally related to said one end of said cylinder having a shape conforming to the internal surface of said one end of said cylinder,
(h) means connected to said boss on said piston and slidably extending through the other end of said cylinder for moving said piston longitudinally within said cylinder, and
(i) the material of said cylinder being such that portions of said cylinder surrounding said piston are successively and sequentially drawn radially inwardly into tight engagement with said piston in response to actuation of said means moving said piston longitudinally in said cylinder in a direction away from said bottom wall of said cylinder to induce a vacuum in said cylinder in the portion thereof between said piston and said bottom wall to thus draw gasoline through the passageway of said neck into the cylinder.

References Cited by the Examiner

UNITED STATES PATENTS

| | | | |
|---|---|---|---|
| 1,625,819 | 4/1927 | McNeely | 222—386 |
| 1,815,221 | 7/1931 | Sweetland | 184—1.5 |
| 2,218,899 | 10/1940 | Warren | 141—27 X |
| 2,578,765 | 12/1951 | Wallace | 222—386 X |
| 2,695,115 | 11/1954 | Roop | 220—42 |
| 2,717,728 | 9/1955 | Gray | 220—42 |
| 2,880,913 | 4/1959 | Peyron | 222—386 X |
| 3,133,662 | 5/1964 | Seidler | 220—42 |

FOREIGN PATENTS 532,825  11/1954  Belgium.

LAVERNE D. GEIGER, *Primary Examiner.*